(12) United States Patent
Rothfuss et al.

(10) Patent No.: US 9,182,135 B2
(45) Date of Patent: Nov. 10, 2015

(54) WINDOW AIR CONDITIONER

(75) Inventors: Chris Rothfuss, Laramie, WY (US); Sung-Wei Chen, Las Vegas, NV (US)

(73) Assignee: Empire Technology Development LLC, Wilmington, DE (US)

( * ) Notice: Subject to any disclaimer, the term of this patent is extended or adjusted under 35 U.S.C. 154(b) by 878 days.

(21) Appl. No.: 13/321,081

(22) PCT Filed: Jun. 13, 2011

(86) PCT No.: PCT/US2011/040136
§ 371 (c)(1),
(2), (4) Date: Nov. 17, 2011

(87) PCT Pub. No.: WO2012/173589
PCT Pub. Date: Dec. 20, 2012

(65) Prior Publication Data
US 2012/0312039 A1 Dec. 13, 2012

(51) Int. Cl.
| | | |
|---|---|---|
| *F25D 23/12* | (2006.01) | |
| *F25D 15/00* | (2006.01) | |
| *F25B 15/00* | (2006.01) | |
| *F24F 5/00* | (2006.01) | |
| *F24F 13/18* | (2006.01) | |
| *F25B 15/02* | (2006.01) | |

(52) U.S. Cl.
CPC .............. *F24F 5/001* (2013.01); *F24F 5/0014* (2013.01); *F24F 13/18* (2013.01); *F25B 15/02* (2013.01); *Y02B 30/62* (2013.01)

(58) Field of Classification Search
CPC .......... F24F 5/0014; F24F 13/18; F25B 15/02
USPC .......... 62/101, 235.1, 238.3, 238.1, 262, 476; 165/48.2
See application file for complete search history.

(56) References Cited

U.S. PATENT DOCUMENTS

| | | | | |
|---|---|---|---|---|
| 3,935,897 A | * | 2/1976 | Pulver | ............................. 165/49 |
| 4,024,726 A | | 5/1977 | Furner | |
| 4,165,952 A | * | 8/1979 | Bennett | ......................... 417/207 |

(Continued)

OTHER PUBLICATIONS

International Search Report and Written opinion for application with application No. PCT/US2011/040136, dated Aug. 29, 2011, 10 pages.

(Continued)

*Primary Examiner* — Mohammad M Ali
*Assistant Examiner* — Christopher R Zerphey
(74) *Attorney, Agent, or Firm* — Moritt Hock & Hamroff LLP; Steven S. Rubin, Esq.

(57) ABSTRACT

Technologies are generally described for a window and a method for cooling a room including a window. In some examples, the window may include a first pane and a second pane spaced from and in optical communication with the first pane defining a generator chamber. An evaporator chamber may be disposed in the window with a pressure so that the evaporator chamber is effective to receive heat from the room and boil a refrigerant to produce a first vapor. An absorber chamber may be effective to receive and condense the first vapor on an absorbent to produce a solution. The generator chamber may be effective to receive heat through the first pane, receive the solution and heat the solution to produce a second vapor. A condenser chamber may be effective to receive the second vapor and cool the second vapor to produce the refrigerant.

23 Claims, 3 Drawing Sheets

(56) References Cited

U.S. PATENT DOCUMENTS

| | | | | |
|---|---|---|---|---|
| 4,178,989 | A | * | 12/1979 | Takeshita et al. ............... 165/62 |
| 4,187,688 | A | * | 2/1980 | Berg ............................ 62/235.1 |
| 4,207,744 | A | * | 6/1980 | Takeshita et al. ............ 62/235.1 |
| 4,285,211 | A | * | 8/1981 | Clark ............................... 62/335 |
| 4,467,623 | A | | 8/1984 | Reimann |
| 4,556,049 | A | * | 12/1985 | Tchernev ...................... 126/628 |
| 4,593,538 | A | | 6/1986 | Borde et al. |
| 4,993,234 | A | * | 2/1991 | Korsgaard .................... 62/235.1 |
| 5,239,406 | A | * | 8/1993 | Lynam .......................... 359/275 |
| 6,274,860 | B1 | * | 8/2001 | Rosenberg ................. 250/203.4 |
| 7,887,921 | B2 | * | 2/2011 | Varanasi et al. .............. 428/432 |
| 2010/0107525 | A1 | | 5/2010 | Grzybowski et al. |
| 2010/0119705 | A1 | * | 5/2010 | Roche et al. ................... 427/164 |
| 2012/0234033 | A1 | * | 9/2012 | Kapany et al. .................. 62/262 |

OTHER PUBLICATIONS

Horuz, I., A comparison between ammonia water and water lithium bromide solutions in vapor absorption refrigeration systems. International Communications in Heat and Mass Transfer, 1998, p. 711-721, 25 (5).

Kaushik, S.C. and A. Arora, Energy and exergy analysis of single effect and series flow double effect water-•'lithium bromide absorption refrigeration systems. International Journal of Refrigeration, 2009, p. 1247-1258, 32 (6).

APIC's near infrared absorbing pigments. Focus on Pigments, 2006. 2006(11): p. 7-7.

Bello, K.A. and J.O. Ajayi, Near infrared absorbing squarylium dyes. Dyes and Pigments, 1996, p. 79-87, 31 (2).

Boyer, A.E., et al., Spectroscopic studies of a near infrared absorbing pH sensitive carbocyanine dye. Talanta, 1992, p. 505-510, 39 (5).

Campbell, J., et al., Extended bis-aryldithiolene nickel complexes: Near infrared absorbing compounds. Dyes and Pigments, 1991, p. 15-22, 15 (1).

Chao, Y.C., 1,4,5,8 Tetrakis (arylamino) anthraquinones: near infrared absorbing dyes. Dyes and Pigments, 1992, p. 123-128, 19 (2).

Cherukuri, P. et al., Targeted hyperthermia using metal nanoparticles. Advanced Drug Delivery Reviews, 2010, p. 339-345, 62 (3).

Czerney, P. and U.W. Grummt, New near infrared absorbing acidochromic dyes and their application in sensor techniques. Sensors and Actuators B: Chemical, p. 395-400, 39 (1-3).

Deligeorgiev, T.G. and N.I. Gadjev, Near infrared absorbing pyrylium trimethinecyanine dyes. Dyes and Pigments, 1990, p. 157-162, 12 (2).

Gadjev, N.I. and T.G. Deligeorgiev, Near infrared absorbing asymmetrical trimethinecyanine dyes. Dyes and Pigments, 1990, p. 73-77, 14 (1).

Hasanain, F. and Z.Y. Wang, The synthesis and characterization of near infrared absorbing, electrochromic polyimides containing a dinuclear ruthenium complex in the polymer mainchain. Dyes and Pigments, 2009, p. 95-101, 83 (1).

Kim, S.H., et al., Novel syntheses of anthraquinonoid near infrared absorbing dyes. Dyes and Pigments, 1986, p. 93-102, 7 (2).

Kojima, C., et al., Preparation of near infrared light absorbing gold nanoparticles using polyethylene glycol attached dendrimers. Colloids and Surfaces B: Biointerfaces, 2010, p. 648-651, 81 (2).

Laska, J., Polyaniline as a near infrared radiation absorbing additive. Materials Science and Engineering B, 1999, p. 76-79, 68 (2).

Lindauer, H., et al., New near infrared absorbing acidochromic dyes and their application in sensor techniques. Dyes and Pigments, 1994, p. 229-235, 26 (3).

Matsuda, Y., et al., Novel synthesis of methine dyes absorbing in the near infrared region. Dyes and Pigments, 1990, p. 225-238, 14 (3).

Ramos, S.S., et al., Some new symmetric rigidified triheterocyclic heptamethinecyanine dyes absorbing in the near infrared. Dyes and Pigments, 2002, p. 143-152, 53 (2).

Salvador, M.A., et al., Near infrared absorbing delocalized cationic azo dyes. Dyes and Pigments, 2009, p. 118-123, 82 (2).

Sekar, N., R.K. Raut, and P.G. Umape, Near Infrared absorbing iron complexed colorants for photovoltaic applications. Materials Science and Engineering: B, 2010, p. 259-262, 168 (1-3).

Stenger, I., et al., Near infrared absorption of Si nanoparticles embedded in silica films. Surface Science, 2007, p. 2912-2916, 601 (14).

Tjahjono, I.K. and Y. Bayazitogiu, Near infrared light heating of a slab by embedded nanoparticles. International Journal of Heat and Mass Transfer, 2008, p. 1505-1515, 51 (7-8).

Villalonga-Barber, C., et al., New stable, isolable triarylmethyl based dyes absorbing in the near infrared. Journal of Organometallic Chemistry, 2006, p. 2785-2792, 691 (12).

Wang, R. Z and R. G. Oliveira, Adsorption refrigeration—An Efficient way to make good use of waste heat and solar energy, International Sorption Heat Pump Conference, 2005, 22 pages.

Deng, J., R.Z. Wang, and G.Y. Han, A review of thermally activated cooling technologies for combined cooling, heating and power systems. Progress in Energy and Combustion Science. In Press, Corrected Proof., 2010, 1032.

Srikhirin, P. and S. Aphornratana, Investigation of a diffusion absorption refrigerator. Applied Thermal Engineering, 2002, p. 1181-1193, 22 (11).

Srikhirin, P., S. Aphornratana, and S. Chungpaibulpatana, A review of absorption refrigeration technologies. Renewable and Sustainable Energy Reviews, 2001, p. 343-372, 5 (4).

Best, R. and N. Ortega, Solar refrigeration and cooling. Renewable Energy. 16(1-4): p. 685-690.

Fan, Y., L. Luo, and B. Souyri, Review of solar sorption refrigeration technologies: Development and applications. Renewable and Sustainable Energy Reviews, 2007, p. 1758-1775, 11 (8).

Kim, D.S. and C.A. Infante Ferreira, Solar refrigeration options a state of the art review. International Journal of Refrigeration, 2008, p. 3-15, 31 (1).

Aphornratana, S. and T. Sriveerakul, Experimental studies of a single effect absorption refrigerator using aqueous lithium bromide: Effect of operating condition to system performance. Experimental Thermal and Fluid Science, 2007, p. 658-669, 32(2).

Asdrubali, F. and S. Grignaffini, Experimental evaluation of the performances of a H2O LiBr absorption refrigerator under different service conditions. International Journal of Refrigeration, 2005, p. 489-497, 28(4).

Donate, M., et al., Thermodynamic evaluation of new absorbent mixtures of lithium bromide and organic salts for absorption refrigeration machines. International Journal of Refrigeration, 2006. 29(1): p. 30-35.

Perry, E.H., The theoretical performance of the lithium bromide water intermittent absorption refrigeration cycle. Solar Energy, 1975. 17(5): p. 321-323.

Yaxiu, G., W. Yuyuan, and K. Xin, Experimental research on a new solar pump free lithium bromide absorption refrigeration system with a second generator. Solar Energy, 2008, p. 33-42, 82(1).

Szyszka, B. and S. Jager, Optical and electrical properties of doped zinc oxide films prepared by ac reactive magnetron sputtering, Journal of Non-Crystalline Solids, 1997, 74-80, vol. 218.

Yong, Li and R. Z. Wang, Adsorption Refrugeration: A survey of Novel Technologies, Recent Patents on Engineering, 2007, 1-21, vol. 1.

Alizadeh, S., Multi-Pressure Absorption cycles in solar refrigeration: A Technical and economical Study, Solar Energy, 2000, 37-44, vol. 69, 1.

Fablan, J., Near-Infrared Absorbing Dyes, Chem. Rev., 1992, 1197-1226, vol. 92.

Fog-Free Glass, Materials Scientists Create Polymer Coating Against Fogged Glass, Science Daily, Jan. 1, 2006, retrieved from http://www.sciencedaily.com/videos/200610112-fogfree_glass.htm, 2 pages.

"Infrared Radiation and Solar Heat Gain," accessed at http://web.archive.org/web/20110423235600/http://www.iwfa.com/iwfa/Consumer_Info/Infrared%20(IR)%20Rejection.html, accessed on Dec. 18, 2014, pp. 2.

"Solar Absorption Refrigerator Animation," accessed at http://www.youtube.com/watch?v=Hu3SbXFEXFA, accessed on Feb. 1, 2011, pp. 2.

* cited by examiner

WINDOW AIR CONDITIONER

CROSS-REFERENCE TO RELATED APPLICATIONS

This application is a U.S. National Stage filing under 35 U.S.C. §371 of International Application No. PCT/US2011/040136, filed Jun. 13, 2011, the entirety of which is hereby incorporated by reference.

BACKGROUND

Unless otherwise expressly indicated herein, none of the material presented in this section is prior art to the claims of this application and is not admitted to be prior art by having been included herein.

In a refrigeration system, an evaporator may draw heat to heat a refrigerant and produce a first vapor. The first vapor may be condensed on an absorbent in an absorbing chamber to produce a solution. A generator chamber may receive and heat the solution to produce a second vapor. A condenser chamber may receive and condense the second vapor to reproduce the refrigerant.

SUMMARY

In one example, a window is generally described. In an example, the window may include a first pane and a second pane spaced from and in optical communication with the first pane. The first and the second pane may define a generator chamber between the first pane and the second pane. An absorber chamber may be in fluid communication with the generator chamber. The absorber chamber may include an absorbent. A condenser chamber may be in fluid communication with the generator chamber. An evaporator chamber may be in fluid communication with the absorber chamber and the condenser chamber. The evaporator chamber may include a refrigerant. The evaporator chamber may be disposed in the window with a pressure so that when the window is placed in a room, the evaporator chamber may be effective to receive heat from the room and boil the refrigerant to produce a first vapor. The absorber chamber may be effective to receive the first vapor from the evaporator chamber and condense the first vapor on the absorbent to produce a solution. The generator chamber may be effective to receive heat through the first pane, receive the solution from the absorber chamber and heat the solution to produce a second vapor. The condenser chamber may be effective to receive the second vapor from the generator chamber and cool the second vapor to produce the refrigerant. The evaporator chamber may be effective to receive the refrigerant from the condenser chamber.

In one example, a window is generally described. In some examples, the window may include a first pane and a second pane spaced from and in optical communication with the first pane. The first and second pane may define a generator chamber between the first pane and the second pane. An absorber chamber may be in fluid communication with the generator chamber. The absorber chamber may include a solution including an absorbent and a refrigerant. A condenser chamber may be in fluid communication with the generator chamber. An evaporator chamber may be in fluid communication with the absorber chamber and the condenser chamber. The evaporator chamber may include a refrigerant in liquid phase and the refrigerant in the gas phase. The generator chamber may include the solution and include the refrigerant in the gas phase. The condenser chamber may include the refrigerant in the liquid phase.

In one example, a method of cooling a room using a window is generally described. The method may include receiving first heat from a room by an evaporator chamber. The method may further include boiling a refrigerant in the evaporator chamber using the first heat from the room to produce a first vapor. The method may further include receiving the first vapor by an absorber chamber in fluid communication with the evaporator chamber. The method may further include condensing the first vapor, in the absorber chamber, on an absorbent to produce a solution. The method may further include receiving the solution by a generator chamber in fluid communication with the absorber chamber. The generator chamber may be defined by a first pane spaced from and in optical communication with a second pane. The method may further include receiving second heat by the generator chamber through the first pane. The method may further include heating the solution in the generator chamber using the second heat to produce a second vapor including the refrigerant. The method may further include receiving the second vapor by a condenser chamber in fluid communication with the generator chamber. The method may further include cooling the second vapor by the condenser chamber to produce the refrigerant. The method may further include receiving, by the evaporator chamber, the refrigerant from the condenser chamber.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE FIGURES

The foregoing and other features of this disclosure will become more fully apparent from the following description and appended claims taken in conjunction with the accompanying drawings. Understanding that these drawings depict only some embodiments in accordance with the disclosure and are therefore not to be considered limiting of its scope, the disclosure will be described with additional specificity and detail by reference to the accompanying drawings in which:

DETAILED DESCRIPTION

Figure 1:
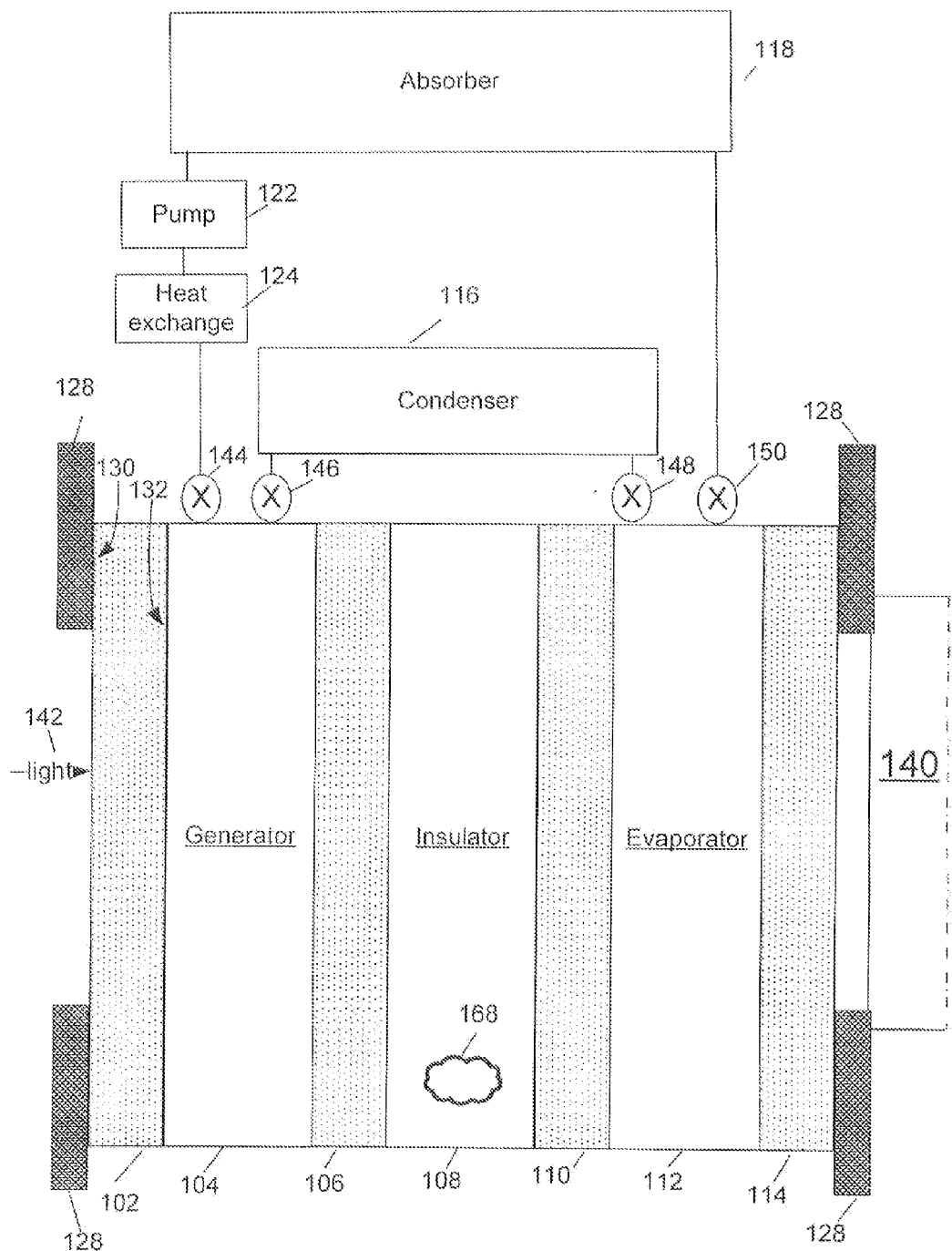
FIG. 1 is a side illustrative view of an example window air conditioner.

In the following detailed description, reference is made to the accompanying drawings which form a part thereof. In the drawings, similar symbols typically identify similar components unless context indicates otherwise. The illustrative embodiments described in the detailed description, drawings and claims are not meant to be limiting. Other embodiments may be utilized and other changes may be made without departing from the spirit or scope of the subject matter presented herein. It will be readily understood that the aspects of the present disclosure as generally described herein and as illustrated in the accompanying figures can be arranged, substituted, combined, separated and/or designed in a wide variety of different configurations all of which are explicitly contemplated herein.

This disclosure is generally drawn, inter alia, to devices, apparatus, systems and methods relating to a window air conditioner.

Briefly stated, technologies are generally described for a window and a method for cooling a room including a window. In some examples, the window may include a first pane and a second pane spaced from and in optical communication with the first pane defining a generator chamber. An evaporator chamber may be disposed in the window with a pressure so that the evaporator chamber is effective to receive heat from the room and boil a refrigerant to produce a first vapor. An absorber chamber may be effective to receive and condense the first vapor on an absorbent to produce a solution. The generator chamber may be effective to receive heat through the first pane, receive the solution and heat the solution to produce a second vapor. A condenser chamber may be effective to receive the second vapor and cool the second vapor to produce the refrigerant.

It will also be understood that any compound, material or substance which is expressly or implicitly disclosed in the specification and/or recited in a claim as belonging to a group or structurally, compositionally and/or functionally related compounds, materials or substances, includes individual representatives of the group and all combinations thereof.

FIG. 1 is a side illustrative view of an example window air conditioner arranged according to at least some embodiments described herein. In some examples, a window air conditioner system 100 may include panes 102, 106, 110, and/or 114 in optical communication. Panes 102 and 106 may be spaced apart and define a generator chamber 104 in between panes 102 and 106. Panes 106 and 110 may be spaced apart and define an insulator chamber 108 between panes 106 and 110. Panes 110 and 114 may be spaced apart and define an evaporator chamber 112 between panes 110 and 114. System 100 may further include an absorber chamber 118, a condenser chamber 116, a pump 122, a heat exchange 124, a heat exchange 120, a window frame 128, and/or valves 144, 146, 148, 150. At least some of the elements in FIG. 1 may be inside a window frame 128. Absorber chamber 118, generator chamber 104, pump 122, heat exchange 124, condenser chamber 116, and/or evaporator chamber 112 may be in fluid communication.

In some examples, panes 102, 106, 110, 114 may be made of amorphous silica, a transparent polymer such as polycarbonate or Polyvinyl chloride (PVC), a crystalline material such as $Al_2O_3$, or glass. In an example, a coating may be applied to a first side 130 of pane 102 with a material that may allow a full range of wavelengths to pass through, such as a material with a transmittance in a range of about 0.7 to about 1.0. An example coating material may be Poly(methyl methacrylate) (PMMA) or a filter such as a polarizing film. A second side 132 of pane 102 may be comprised of and/or coated with a material that tends to reflect wavelengths, such as with a transmittance of about 0.0 to about 0.2, in the mid infra-red frequency spectrum such as wavelengths of about 3 microns to about 50 microns. Such materials may include PMMA, a polycarbonate or borosilicate glass. In this way, heat emitted from a room 140 may be reflected into a solution in generator chamber 104 as discussed in more detail below.

In examples where window air conditioner system 100 is installed in a room, light 142 incident on pane 102 may include wavelengths in the visible spectrum, such as between about 400 nm and about 700 nm, wavelengths in ultra-violet ("UV") spectrum, such as between about 1 nm to about 400 nm, and wavelengths in the infra-red ("IR") spectrum, such as between about 700 nm and about 1 cm. As mentioned above, pane 102 may be coated with a material with a transmittance, such as in a range of about 0.7 to about 1.0, that may allow substantially all of these wavelengths to pass through to generator chamber 104.

Pane 106, or a fluid 180 in generator chamber 104, may be coated with and/or comprised of a material effective to reflect photons with wavelengths in the IR spectrum, such as a material with a transmittance of about 0.0 to about 0.2 for these wavelengths. In this way, photons in this wavelength range may be reflected back into generator chamber 104. Generator chamber 104 may use these photons to heat up a solution in generator chamber 104 as discussed in more detail below. Pane 106 may also be coated with and/or comprised of a material with a relatively high transmittance, such as between about 0.7 to about 1.0, for wavelengths in the visible wavelength spectrum. Pane 106 may be coated with and/or comprised of a material with a relatively low thermal conductivity so that heat energy incident on pane 106 from light 142 may be inhibited from travelling to room 140. Examples of coatings for pane 106 may include squarylium, carbocyanine dyes, nickel complexes, metal nanoparticles, insulating plastics such as polycarbonate, polymethylmethacrylate (PMMA), polyethylene terephthalate, PVC, etc. Other types of dyes, nanoparticles, and/or polymers may be added to a coating on pane 106. For example, pane 106 may also include a polyvinyl butyral interlayer laminated glass effective to reflect photons in the UV spectrum.

Pane 110 may be coated with and/or comprised of a material of a relatively low thermal conductivity such as plastics such as polycarbonate, PMMA, polyethylene terephthalate, PVC, and a relatively high transmittance, such as in a range of about 0.7 to 1.0, for most wavelengths. Pane 114 may be coated with and/or comprised of a material with a relatively high transmittance, such as in a range of about 0.7 to about 1.0, and/or high thermal conductivity such as glass, crystal quartz, fused silica, $Al_2O_3$, etc. In an example, panes 102, 106, 110 and/or 114 may be made of, for example, glass, amorphous silica, quartz, sapphire, diamond, crystal, PET (Polyethylene terephthalate), PMMA, etc. A side of pane 114 closest to room 140 may be coated with and/or comprised of an anti-fog material such as a super hydrophilic or super hydrophobic material such as hydrolyzed fluoroalkyltrimethoxysilane coated alumina, coated nanoparticles, nanocrystalline anatase titanium dioxide, a nanoporous polymer film, etc. to avoid a fogging of pane 114. In these examples, water on pane 114 may wet the window surface generally uniformly or large droplets may form and fall due to gravity, so that a transmittance of pane 114 may remain relatively high.

In an example, insulator chamber 108 may include a gas 168 with a relatively low thermal conductivity such as argon or krypton. In an example, insulator chamber 108 could include a vacuum seal. Insulator chamber 108 may provide thermal isolation between generator chamber 104 and evaporator chamber 112.

Figure 2:
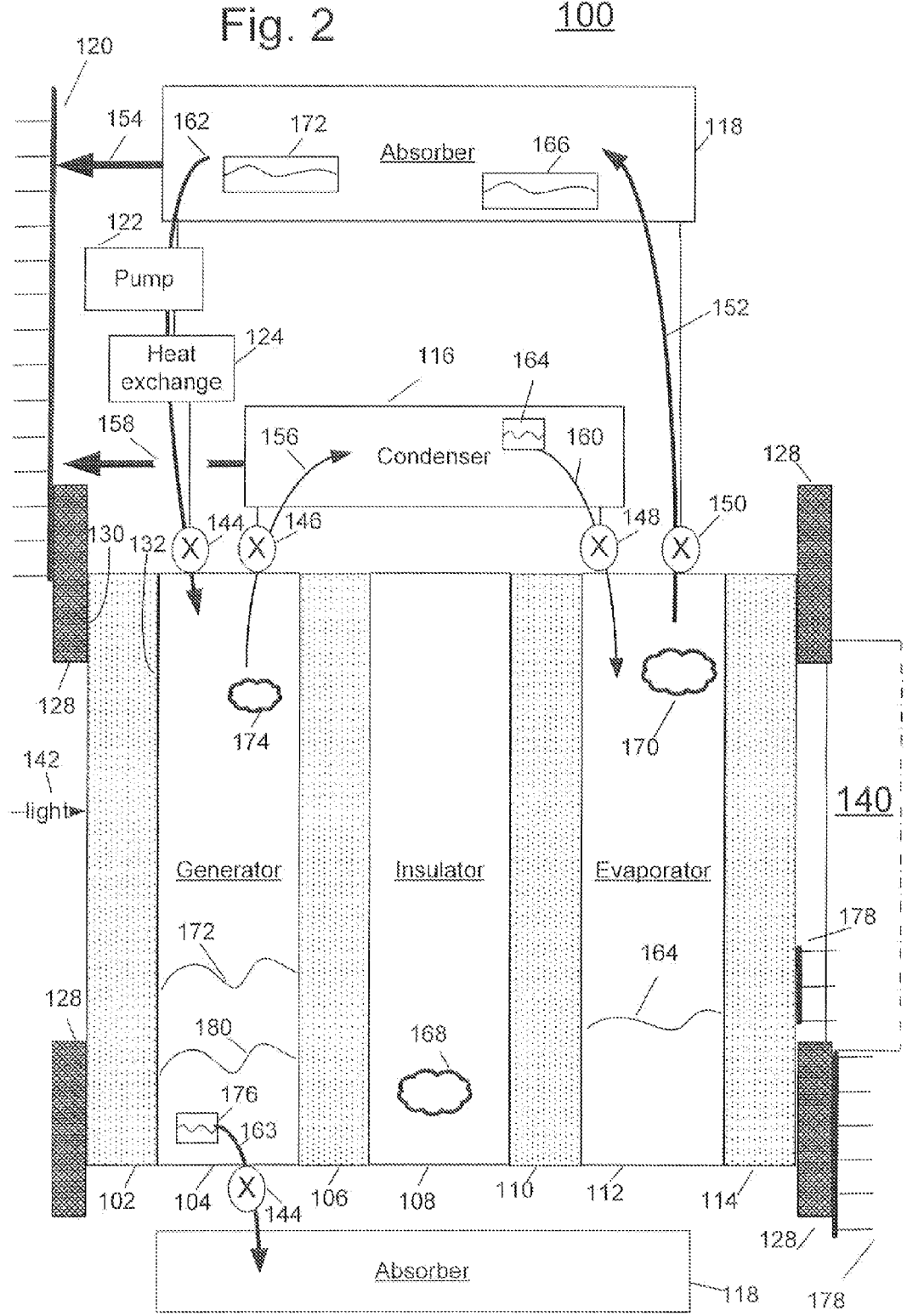
FIG. 2 is a side illustrative view of an example window air conditioner.

FIG. 2 is a side illustrative view of an example window air conditioner arranged according to at least some embodiments described herein. The system of FIG. 2 is substantially similar to system 100 of FIG. 1, with additional details. Those components in FIG. 2 that are labeled identically to components of FIG. 1 will not be described again for the purposes of clarity.

As shown in FIG. 2, evaporator chamber 112 may include a refrigerant 164 such as water, ammonia, butane, alcohols, fluorocarbons, chlorofluorocarbons, hydrochlorofluorocarbons, bromochlorofluorocarbons, hydrofluorocarbons, hydrocarbons, carbon dioxide, etc. in liquid phase. Evaporator chamber 112 may be kept at a relatively low pressure so that refrigerant 164 can be boiled at a relatively low temperature. For example, evaporator chamber 112 may be kept at a pressure of about 5 kPa to about 50 kPa. Evaporator chamber 112 may be kept at a pressure lower than that of room 140. For example, refrigerant 164 may be effective to boil at a temperature in a range of about 30 degrees Celsius to about 40 degrees Celsius. Evaporator chamber 112 may be effective to conduct heat from room 140 and boil refrigerant 164 to produce a vapor 170 including refrigerant 164 in the gas phase. In an example, a heat exchange 178 may be placed on frame 128 and/or pane 114 and may be effective to conduct heat from room 140 to evaporator chamber 112: As shown by arrow 152, a pressure generated by water vapor 170 may be effective to open valve 150 and cause vapor 170 to move to absorber chamber 118. Valve 150 may be a check valve effective to maintain a desired pressure in evaporator chamber 112. Absorber chamber 118 may be at any location in system 100. For example, absorber chamber 118 may be located above, below and/or to a side of evaporator chamber 112.

Absorber chamber 118 may include an absorbent 166, such as a solution of lithium bromide and water, water, silica, zeolite, activated carbon, an aqueous salt solution, etc. Absorber chamber 118 may be maintained at the same or similar pressure as evaporator chamber 112 without vapor 170. As absorbent 166 may have a lower boiling point than refrigerant 164, in examples when vapor 170 enters absorber chamber 118, vapor 170 may condense on and/or be absorbed by or adsorbed by absorbent 166. As vapor 170 condenses, heat from vapor 170 may be fed outside system 100 through a convective heat exchanger 120 such as a fin, pin fin, heat pipe etc. in thermal communication with absorber chamber 118 as shown by arrow 154.

Over time, absorbent 166 may become diluted with refrigerant 164 and become less effective at condensing vapor 170. Absorbent 166 may be re-concentrated by reducing a ratio between refrigerant 164 and absorbent 166. For example, pump 122 may pump a solution 172 of absorbent and refrigerant into generator chamber 104 as shown by arrow 162. Pump 122 may, for example, receive power external from window air conditioner system 100, and/or receive thermal power such as in a bubble pump. A heat exchanger 124 may be used between pump 122 and generator chamber 104 to enhance heat exchange efficiency between absorber chamber 118 and generator chamber 104. In an example, pump 122 may be run on a timer so that pump 122 may be set to activate periodically. In an example, pump 122 may be set to run substantially all the time and at a relatively slow rate.

Generator chamber 104 may be maintained at a pressure higher than the pressure in absorber chamber 118 and/or evaporator chamber 112. Generator chamber 104 may be effective to receive heat from light 142. As panes 102 and/or 106 may include coatings with transmittances effective to allow visible light to pass through generator chamber 104 and to reflect light in the IR and/or UV spectra back into generator chamber 104, heat energy may be provided to generator chamber 104 to heat solution 172. In an example, if light 142 includes energy of 1000 W/m$^2$, generator chamber 104 may absorb 560 W/m$^2$ and transmit 440 W/m$^2$ of light energy in the visible spectrum. Heat in generator chamber 104 may be effective to boil refrigerant 164 in liquid phase in solution 172 to produce vapor 174 including refrigerant 164 in the gas phase. The presence of vapor 174 may cause a pressure differential effective to open valve 146 and cause vapor 174 to move to condenser chamber 116. Valve 146 may be a pressure valve effective to maintain a desired pressure in generator chamber 104. As condenser chamber 116 may be a chamber that does not receive energy from light 142, or receives less energy than generator chamber 104, condenser chamber 116 may be effective to condense vapor 174 in the gas phase into refrigerant 164 in the liquid phase. In an example, condenser 116 may be maintained at the same or similar pressure as generator chamber 104 without vapor 174. As vapor 174 condenses, heat from vapor 174 may be fed outside system 100 through convective heat exchanger 120, in thermal communication with condenser chamber 116, as shown by arrow 158. When a pressure between condenser 116 and evaporator chamber 112 reaches a set difference level, throttle valve 148 may open allowing refrigerant 164 to move back into evaporator chamber 112 and continue the above described cycle.

When vapor 174 is generated in generator chamber 104, a pressure differential between generator chamber 104 and absorber chamber 118 may be generated. This pressure differential may be sufficient to open valve 144 and allow absorbent 166 to move back to absorber chamber 118 as shown by arrow 163. Absorbent 166 may be fed to absorber chamber 118 through valve 144 such as by gravity.

Among other potential benefits, a system in accordance with the disclosure may be used to take advantage of passive heat energy radiant upon a window in a building. A system may be effective to turn radiant heat into cool air. A thermal gain from light incident from the sun may be used to power a system effective to cool a room with a window. As visible light may be transmitted, a window in accordance with the disclosure may provide visibility to locations outside of a room. In an example, a 1 m$^2$ window may yield a net cooling effect of 341 kWh/year. A passive operation in an integrated window package may be realized providing substantially continuous operation and minimal maintenance. Multiple windows or panes may share one or more of the described absorber chamber, condenser chamber or pump.

Figure 3:
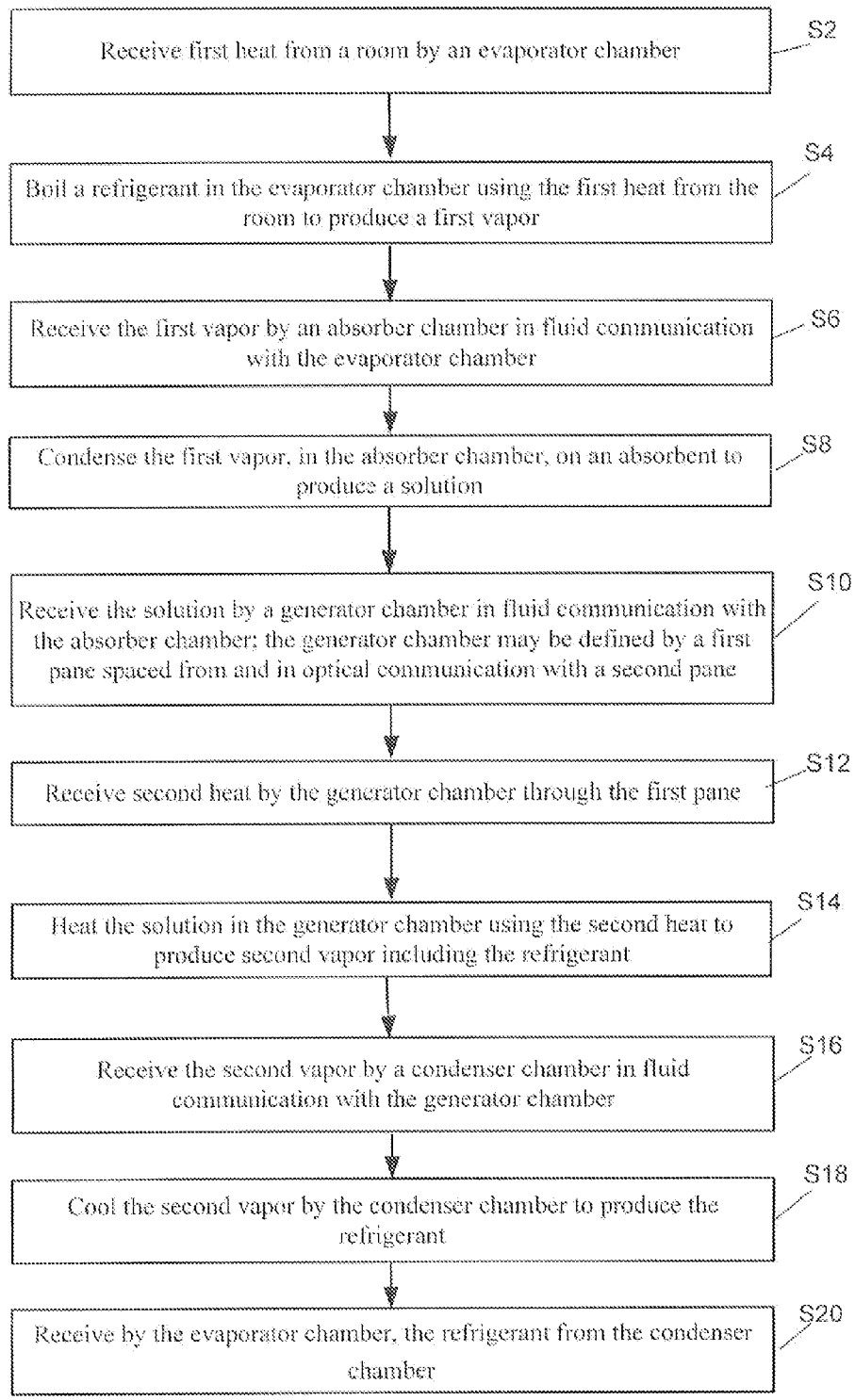
FIG. 3 depicts a flow diagram for an example process for implementing a window air conditioner;all arranged according to at least some embodiments described herein.

FIG. 3 depicts a flow diagram for an example process 200 for implementing a window air conditioner arranged in accordance with at least some embodiments described herein. The process in FIG. 2 could be implemented using, for example, system 100 discussed above. An example process may include one or more operations, actions, or functions as illustrated by one or more of blocks S2, S4, S6, S8, S10, S12, S14, S16, S18 and/or S20. Although illustrated as discrete blocks, various blocks may be divided into additional blocks, combined into fewer blocks, or eliminated, depending on the desired implementation.

Process 200 may begin at block S2, "Receive first heat from a room by an evaporator chamber" At block S2, an evaporator chamber may be configured effective to receive heat from a room.

Processing may continue from block S2 to block S4, "Boil a refrigerant in the evaporator chamber using the first heat from the room to produce a first vapor." In block S4, the evaporator chamber may boil a refrigerant using the first heat from the room to produce a first vapor.

Processing may continue from block S4 to block S6, "Receive the first vapor by an absorber chamber in fluid communication with the evaporator chamber." At block S6, an absorber chamber may receive the first vapor.

Processing may continue from block S6 to block S8, "Condense the first vapor, in the absorber chamber, on an absorbent to produce a solution." At block S8, the first vapor may be condensed in the absorber chamber on an absorbent to produce a solution.

Processing may continue from block S8 to block S10, "Receive the solution by a generator chamber in fluid communication with the absorber chamber; the generator chamber may be defined by a first pane spaced from and in optical communication with a second pane." At block S10, a generator chamber may receive the solution. The generator chamber may be defined by a first and a second pane spaced and in optical communication with each other.

Processing may continue from block S10 to block S12, "Receive second heat by the generator chamber through the first pane." At block S12, second heat may be received by the generator chamber through the first pane.

Processing may continue from block S12 to block S14, "Heat the solution in the generator chamber using the second heat to produce second vapor including the refrigerant." At block S14, the generator chamber may use the second heat to heat the solution and produce second vapor including the refrigerant.

Processing may continue from block S14 to block S16, "Receive the second vapor by a condenser chamber in fluid communication with the generator chamber." At block S16, a condenser chamber may receive the second vapor.

Processing may continue from block S16 to block S18, "Cool the second vapor by the condenser chamber to produce the refrigerant." At block S18, the second vapor may be cooled by the condenser chamber to produce the refrigerant.

Processing may continue from block S18 to block S20, "Receive by the evaporator chamber, the refrigerant from the condenser chamber." At block S20, the evaporator chamber may receive the refrigerant from the condenser chamber.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds compositions or biological systems, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A window comprising:
a first pane transparent to visible light;
a second pane transparent to visible light, the second pane spaced from and in optical communication with the first pane, wherein the first and second pane define a generator chamber between the first pane and the second pane;
a third pane transparent to visible light, the third pane in optical communication with the second pane, wherein the second pane and the third pane define an insulator chamber between the second pane and the third pane;
a fourth pane transparent to visible light, the fourth pane in optical communication with the third pane, wherein the third pane and the fourth pane define an evaporator chamber in between the third pane and the fourth pane;
an absorber chamber in fluid communication with the generator chamber, wherein the absorber chamber includes an absorbent; and
a condenser chamber in fluid communication with the generator chamber;
wherein
the evaporator chamber includes a refrigerant and the evaporator chamber is in fluid communication with the absorber chamber and the condenser chamber;
the evaporator chamber is disposed in the window with a pressure so that when the window is placed in a room, the evaporator chamber is effective to receive heat from the room and boil the refrigerant to produce a first vapor;
the absorber chamber is effective to receive the first vapor from the evaporator chamber and condense the first vapor on the absorbent to produce a solution;
the generator chamber is effective to receive heat through the first pane, receive the solution from the absorber chamber and heat the solution to produce a second vapor, wherein the solution contacts the first pane and the second pane;
the condenser chamber is effective to receive the second vapor from the generator chamber and cool the second vapor to produce the refrigerant; and
the evaporator chamber is effective to receive the refrigerant from the condenser chamber.

2. The window as recited in claim 1, wherein the second pane includes a coating, wherein the coating includes:
a transmittance of about 0.7 to about 1.0 for wavelengths in the visible spectrum;
a transmittance of about 0.0 to about 0.2 for wavelengths in the IR spectrum; and
a transmittance of about 0.0 to about 0.2 for wavelengths in the UV spectrum.

3. The window as recited in claim 1, wherein the first pane includes a coating with a transmittance of about 0.0 to about 0.2 for wavelengths in the far IR spectrum.

4. The window as recited in claim 1, wherein the second pane includes a coating, wherein the coating includes at least one of squarylium, a carbocyanine dye, a nickel complex or a metal nanoparticle.

5. The window as recited in claim 1, further comprising:
a first valve between the generator chamber and the absorber chamber;
a second valve between the generator chamber and the condenser chamber;
a third valve between the condenser chamber and the evaporator chamber; and
a fourth valve between the absorber chamber and the evaporator chamber.

6. The window as recited in claim 1, further comprising a window frame; wherein
the window frame includes a heat exchange; and
the evaporator chamber is effective to receive heat from the room through the heat exchange.

7. The window as recited in claim 1, wherein the fourth pane includes a coating that is one of hydrophobic or hydrophilic.

8. The window as recited in claim 1, further comprising a window frame, and wherein the evaporator chamber, the absorber chamber, the condenser chamber, and the generator chamber are in the window frame.

9. The window as recited in claim 1, further comprising:
a pump in fluid communication with the absorber chamber and the generator chamber, wherein the pump is effective to pump the solution from the absorber chamber to the generator chamber.

10. The window as recited in claim 1, further comprising:
a first heat exchange in thermal communication with the condenser chamber, wherein the first heat exchange is effective to conduct heat from the condenser chamber to outside the window; and
a second heat exchange in thermal communication with the absorber chamber, wherein the second heat exchange is effective to conduct heat from the absorber chamber to outside the window.

11. The window as recited in claim 1, wherein the refrigerant includes water and the absorbent includes lithium bromide.

12. The window as recited in claim 1, wherein the refrigerant includes ammonia and the absorbent includes water.

13. The window as recited in claim 1, wherein the generator chamber includes a fluid comprised of a material with a transmittance of about 0.0 to about 0.2 for wavelengths in the IR spectrum.

14. A window comprising:
a first pane transparent to visible light;
a second pane transparent to visible light, the second pane spaced from and in optical communication with the first pane, wherein the first and second pane define a generator chamber between the first pane and the second pane;
an absorber chamber in fluid communication with the generator chamber, wherein the absorber chamber includes a solution including an absorbent and a refrigerant;
a third pane transparent to visible light, the third pane in optical communication with the second pane, wherein the second pane and the third pane define an insulator chamber between the second pane and the third pane;
a fourth pane transparent to visible light, the fourth pane in optical communication with the third pane, wherein the third pane and the fourth pane define an evaporator chamber in between the third pane and the fourth pane;
a condenser chamber in fluid communication with the generator chamber; and
the evaporator chamber in fluid communication with the absorber chamber and the condenser chamber, wherein
the evaporator chamber includes a refrigerant in liquid phase and the refrigerant in the gas phase; wherein
the generator chamber includes the solution and includes the refrigerant in the gas phase, wherein the solution contacts the first pane and the second pane; and
the condenser chamber includes the refrigerant in the liquid phase.

15. The window as recited in claim 14, wherein the second pane includes a coating, wherein the coating includes:
- a transmittance of about 0.7 to about 1.0 for wavelengths in the visible spectrum;
- a transmittance of about 0.0 to about 0.2 for wavelengths in the IR spectrum; and
- a transmittance of about 0.0 to about 0.2 for wavelengths in the UV spectrum.

16. The window as recited in claim 14, wherein the second pane includes a coating, wherein the coating includes at least one of squarylium, a carbocyanine dye, a nickel complex or a metal nanoparticle.

17. The window as recited in claim 14, wherein the refrigerant includes water and the absorbent includes lithium bromide.

18. A method of cooling a room using a window, the method comprising:
- receiving first heat from a room by an evaporator chamber, the evaporator is defined by a first pane transparent to visible light spaced from and in optical communication with a second pane transparent to visible light;
- boiling a refrigerant in the evaporator chamber using the first heat from the room to produce a first vapor;
- receiving the first vapor by an absorber chamber in fluid communication with the evaporator chamber;
- condensing the first vapor, in the absorber chamber, on an absorbent to produce a solution;
- receiving the solution by a generator chamber in fluid communication with the absorber chamber, wherein the generator chamber is defined by a third pane transparent to visible light spaced from and in optical communication with a fourth pane transparent to visible light, wherein the third pane is in optical communication with the second pane;
- receiving second heat by the generator chamber through the fourth pane;
- heating the solution in the generator chamber using the second heat to produce second vapor including the refrigerant, wherein the solution contacts the third pane and the fourth pane;
- receiving the second vapor by a condenser chamber in fluid communication with the generator chamber;
- cooling the second vapor by the condenser chamber to produce the refrigerant; and
- receiving, by the evaporator chamber, the refrigerant from the condenser chamber.

19. The method as recited in claim 18, wherein the third pane includes a coating, wherein the coating includes:
- a transmittance of about 0.7 to about 1.0 for wavelengths in the visible spectrum;
- a transmittance of about 0.0 to about 0.2 for wavelengths in the IR spectrum; and
- a transmittance of about 0.0 to about 0.2 for wavelengths in the UV spectrum.

20. The method as recited in claim 18, wherein the third pane includes a coating, wherein the coating includes at least one of squarylium, a carbocyanine dye, a nickel complex or a metal nanoparticle.

21. The method as recited in claim 18, further comprising receiving the first heat from the room through a heat exchange in a window frame.

22. The method as recited in claim 18, further comprising pumping the solution from the absorber chamber to the generator chamber.

23. The method as recited in claim 18, wherein the refrigerant includes water and the absorbent includes lithium bromide.

* * * * *